(12) United States Patent
Kanbe (10) Patent No.: US 6,711,117 B1
(45) Date of Patent: Mar. 23, 2004

(54) DISK DRIVE INCORPORATING VIBRATION SUPPRESSING MECHANISM

(75) Inventor: Shinichi Kanbe, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/700,774

(22) PCT Filed: Mar. 15, 2000

(86) PCT No.: PCT/JP00/01568
§ 371 (c)(1),
(2), (4) Date: Feb. 5, 2001

(87) PCT Pub. No.: WO00/55852
PCT Pub. Date: Sep. 21, 2000

(30) Foreign Application Priority Data

Mar. 18, 1999 (JP) .............................. 11-073354

(51) Int. Cl.⁷ .............................................. G11B 19/20
(52) U.S. Cl. ....................................................... 369/270
(58) Field of Search ................................ 369/270, 264, 369/253, 263; 360/99.12, 99.05, 99.08; 29/759; 310/51, 67 R (56) References Cited

U.S. PATENT DOCUMENTS

| | | | | |
|---|---|---|---|---|
| 6,061,325 A | * | 5/2000 | Zaun | 369/264 |
| 6,158,112 A | * | 12/2000 | Kim et al. | 29/759 |
| 6,438,094 B1 | * | 8/2002 | Mahr et al. | 369/253 |
| 6,477,133 B1 | * | 11/2002 | Yoshimura et al. | 369/263 |
| 6,507,555 B1 | * | 1/2003 | Masaki et al. | 369/263 |
| 6,535,475 B1 | * | 3/2003 | Sohn et al. | 369/264 |

FOREIGN PATENT DOCUMENTS

| | | | |
|---|---|---|---|
| JP | 10-83622 | | 3/1998 |
| JP | 10083622 A | * | 3/1998 |
| JP | 2000182317 A | * | 6/2000 |

* cited by examiner

Primary Examiner—Tianjie Chen
(74) Attorney, Agent, or Firm—RatnerPrestia (57) ABSTRACT

A disc drive apparatus includes a balancer having a hollow annular section (14) that houses magnetic substances (13), a clamp (10) unitarily spinning with a disc (1), a magnetic generator (272) for generating magnetic flux coupling with the magnetic substances (13) through electric-magnetic transducing, and a controller for controlling an output from the magnetic generator (272). This vibration damper built in the disc drive apparatus allows the apparatus to cancel the unbalance at spinning the disc as well as arrest read-errors at a change of rpm or a spin-up.

4 Claims, 7 Drawing Sheets

FIG. 7 PRIOR ART

DISK DRIVE INCORPORATING VIBRATION SUPPRESSING MECHANISM

THIS APPLICATION IS A U.S. NATIONAL PHASE APPLICATION OF PCT INTERNATIONAL APPLICATION PCT/JP00/01568.

TECHNICAL FIELD

The present invention relates to a disc drive apparatus in which a vibration damper is integrated. The vibration damper arrests self-vibration of a disc due to unbalance of the disc per se. The disc is a medium used in a CD-ROM drive apparatus or a CD-R drive apparatus. This vibration damper allows the disc drive apparatus to record/reproduce data in a stable manner.

BACKGROUND ART

A data transfer rate of a disc drive apparatus—recording/reproducing data—employed in a CD-ROM or CD-R drive apparatus has recently become higher and higher. This requires a disc to revolve at a higher speed.

In general, many discs have uneven thickness, which causes unbalance in mass of the disc. When such a disc is driven at a high speed, the following inconveniences are produced: Self-vibration is produced by unbalance force of the disc, and the vibration travels to overall apparatus, so that data cannot be reproduced in a stable manner, and the vibration yields noise as well as shortens the service life of the motor. When the disc drive apparatus is integrated into a computer system, the vibration may travel to other peripherals and adversely affect them.

At a higher data-transfer-rate by spinning the disc at a higher speed, i.e. revolutions per minute (rpm), the self-vibration due to disc's unbalance is desirably arrested. For that purpose, various measures have been proposed to cancel the unbalance of the disc. The Japanese Patent Application Non-Examined Publication No. H10-83622 proposes one of the measures.

A disc drive apparatus having a conventional canceling function is described hereinafter.

Figure 5:
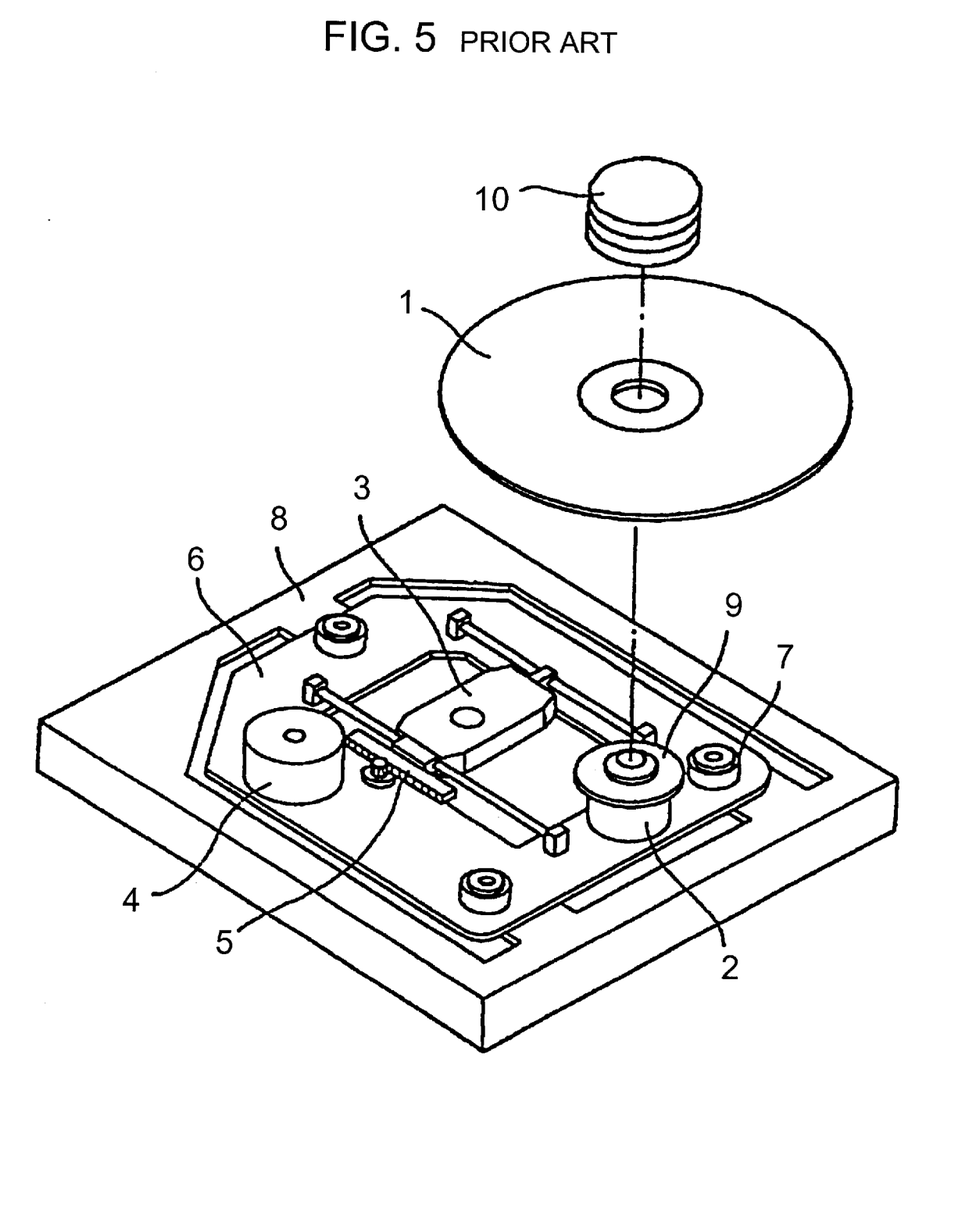
FIG. 5 is a perspective view of a conventional optical disc drive apparatus.
Figure 6:
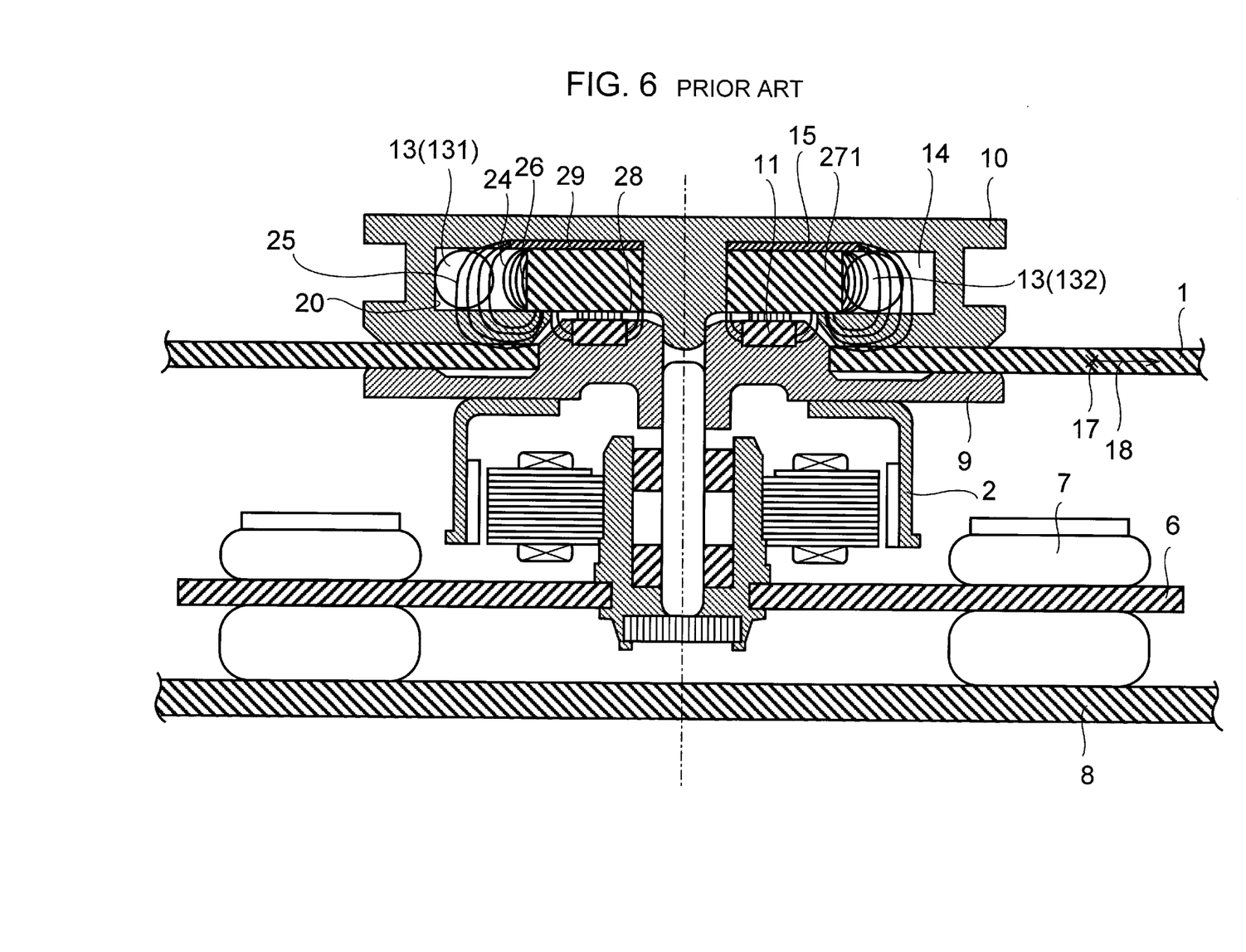
FIG. 6 is a lateral cross section of an essential part of an optical disc drive apparatus having a conventional balancer.
Figure 7:
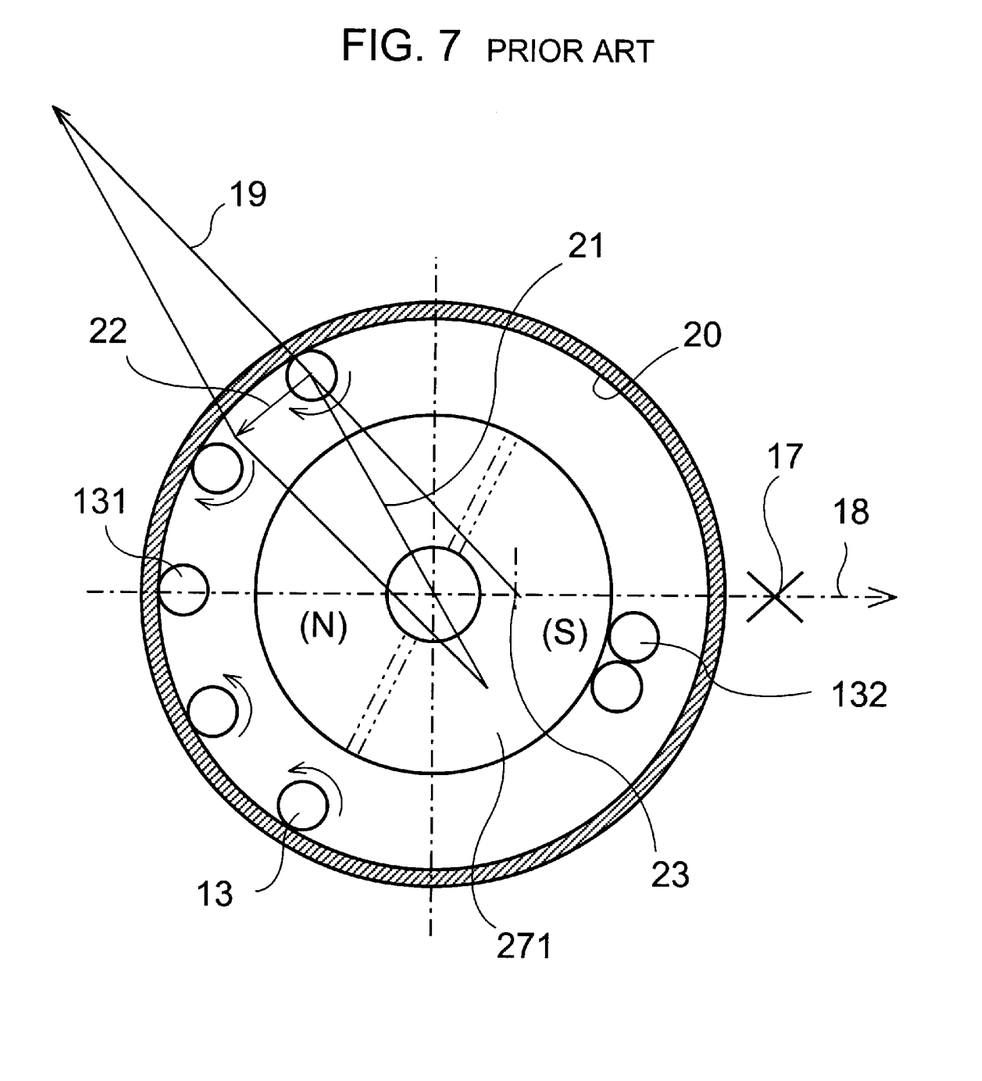
FIG. 7 is a cross section viewed from the top of the balancer.

FIG. 5 is a perspective view of a conventional optical disc drive apparatus having a balancer to cancel the unbalance of centrifugal force at revolving the disc. FIG. 6 is a lateral cross section of the essential part of the same apparatus. FIG. 7 is a cross section viewed from the top illustrating the balancer.

In FIG. 5, on main base 8 of the optical disc drive apparatus, the following elements are arranged to function as described below:

Spindle motor 2 spins disc 1. Photo pickup 3 reads data recorded in disc 1 or write data into disc 1. Photo pickup driving system 5 comprises a rack and a pinion. Driving system 5 transduces rotational motion of motor 4 into linear motion of pickup 3. Motor 4 is used for driving the photo pickup. At this time, driving system 5 moves pickup 3 in radial direction of disc 1. Spindle motor 2, motor 4 and driving system 5 are mounted on sub-base 6.

Elastic isolator 7 damps vibrations and shocks coming from the outside of the apparatus and travelling to sub-base 6. Sub-base 6 is mounted to main base 8 with isolator 7 in between. At a high rpm of disc 1, isolator 7 is deformed, which produces a resonant frequency of sub-base 6. The resonant frequency is set at a lower level than a rotating frequency of disc 1 driven at a high rpm, so that the vibrations or shocks from the outside is damped by isolator 7.

In FIG. 6, ferromagnetic yoke 11 is fixed to turntable 9, and turntable 9 spins unitarily with spindle motor 2. Clamp 10 incorporates magnet 271. Disc 1 is held by turntable 9 and clamp 10 due to magnet attraction between magnet 271 and yoke 11, and is unitarily spun with turntable 9.

Polarized face 28 of magnet 271 is usually polarized two polarities (N and S poles in pair), as shown in FIG. 7, for easy manufacturing as well as due to a simple application. On the other hand, back-yoke 15 made of ferromagnetic substance is disposed on non-polarized face 29 of magnet 271. Back-yoke 15 shuts out leakage magnetic flux from others except polarized face 28, so that magnetic flux travelling from face 28 to yoke 11 is efficiently secured. This strengthens attraction between magnet 271 and yoke 11. As a result, disc 1 is held more firmly between clamp 10 and turntable 9.

Hollow annular section 14 of clamp 10 accommodates a plurality of movable balls 13 (single ball position 131, 132, and onward) made of magnetic substance. Ball position 131 indicates its location at a high rpm, and centrifugal force urges ball position 131 against outer wall 20 of hollow annular section 14. In this condition, ball 13 at position 131 revolves. Ball position 132, on the other hand, indicates its location at a low rpm. In this case, ball 13 at position 132 is attracted to the inner wall of hollow annular section 14, i.e. the outer wall of magnet 271, by attraction of magnet 271. The balancer comprises clamp 10, balls 13, magnet 271 and back yoke 15. This balancer is mounted on sub-base 6 via disc 1, turntable 9 and spindle motor 2. Sub-base 6 is coupled to main base 8 via isolator 7. As already discussed, high speed rotation of disc 1 deforms isolator 7, and the resonant frequency of sub-base 6 due to the deformation of isolator 7 is set at a lower level than the rotating frequency of disc 1 revolving at a high rpm.

FIG. 7 is a cross section of clamp 10 viewed from the top. FIG. 7 illustrates how the unbalance is cancelled at a high rpm of disc 1 by the movement of balls 13 housed in clamp 10.

A status of balls 13 at a low rpm of unbalance disc 1 is described, and how the unbalance of disc 1 is cancelled at a high rpm is also described hereinafter.

In a CD-ROM drive apparatus, in general, the disc is spun at a higher speed (in eight times mode, max ca. 4200 rpm) in order to increase data transfer rate in the data read mode. On the other hand, the disc is spun at a standard rate (ca. 200–500 rpm) in an audio play mode. As such, a high rpm for data read and a low rpm for audio play are intermingled.

When disc 1 having unbalance is spun at a high rpm, unbalance force, namely centrifugal force, acts to gravity center 17 of disc 1, and the act-direction revolves together with disc 1. This unbalance force 18 deforms isolator 7, and sub-base 6 vibrates at a rotating frequency of disc 1. Since the resonant frequency of sub-base 6 is set at a lower level than the rotating frequency of disc 1, the displacement direction of sub-base 6 is always reverse to the direction of unbalance force 18. As a result, balls 13 housed movably in clamp 10 receive resultant force of centrifugal force 19 and resistant force 21 from wall 20 to which balls 13 are urged. This resultant force functions as moving force 22. Balls 13 thus move away from vibrating center 23 and collect in the right reverse direction to unbalance force 18. Finally, a total mass of balls 13 gathered at ball position 131 at the high rpm cancels unbalance volume of disc 1.

In a low rpm area including a standard rate, centrifugal force 19 of balls 13 decreases, which cannot keep urging balls 13 onto wall 20. Balls 13 then become unstable, so that various noises are generated such as rolling and sliding of balls 13 on the walls within clamp 10, and collision between balls 13.

In the low rpm area, if the unbalance force is negligible small and centrifugal force urges balls 13 against wall 20, the unbalance force would increase because the centrifugal force acts to balls 13.

For avoiding this problem, balls 13 are to be made of magnetic substance, and balls 13 are urged to outer wall 26 of magnet 271 and back yoke 15 by utilizing leakage magnetic flux 24 of magnet 271 or magnetic flux 25 travelling from polarized face 28 to back yoke 15. As a result, balls 13 are rested at ball position 132 at a low rpm, thereby preventing the noises from being generated.

However, in the conventional structure discussed above, there may be the following problem when disc 1 suddenly changes its rotating rate from a high rpm to a low rpm.

A disc to be loaded to a CD-ROM drive apparatus includes normal data intermingled with audio data. When such a disc is played back, the normal data are read at the high rpm and then the rpm is changed to the standard one to play back the audio data. In other words, there may be a case, where the disc is spun at the high rpm and suddenly the rotating speed is changed to the low rpm, then the audio data must be played back right after this change.

As discussed previously, balls 13 are urged to wall 20 of hollow annular section 14 and spun unitarily with clamp 10 so that the unbalance of disc 1 is cancelled at the high rpm. However, when the rotating speed lowers to a given speed, the centrifugal force applied to balls 13 decreases. Then balls 13 are attracted to outer wall 26 and yoke 15 due to leakage magnetic flux 24 of magnet 271 as well as magnetic flux 25 travelling from polarized face 28 to back yoke 15. Yet, polarized face 28 of magnet 271 is polarized two polarities, and in the case of the two polarities, leakage magnetic flux 24 becomes greater while the density of magnetic flux 25 becomes smaller. Because of this characteristics, balls 13 are difficult to be released from outer wall 26 of magnet 271 when disc 1 undergoes the change from a low rpm to a high rpm. On the contrary, when disc 1 undergoes the change from the high rpm to the low rpm, balls 13 are difficult to be attracted to outer wall 26 because balls 13 won't be released from wall 20 unless centrifugal force 19 applied to balls 13 substantially decreases.

As such, in the case that normal data is read at a high rpm and then audio play starts just after the data-read, the characteristics of balls 13—difficult to be released from wall 20 and difficult to be attracted to wall 26—allow balls 13 to be attracted to wall 26 after the audio data starts being read. The shock by the attraction travels to disc 1, and may cause a read-error.

When a disc start spinning, namely at the spin-up, balls 13 won't be released from wall 26 because of great leakage magnetic flux 24. When the rotating speed reaches to highly enough level, balls 13 are released from wall 26 and crash to wall 20, the shock becomes greater at the higher speed. As a result, this crash may cause defectives such as exceeding a spin-up time.

Disclosure of the Invention

The present invention addresses the problems discussed above and aims to cancel unbalance efficiently by utilizing the centrifugal force of balls at a high rpm where the unbalance of a disc reveals as a problem. The present invention also aims to prevent noises from being generated by resting the balls at a low rpm including an audio-play mode. Further, the present invention provides a disc drive apparatus free from read-errors even when the disc undergoes a sudden change from the high rpm to the low rpm or at a spin-up.

The disc drive apparatus of the present invention comprises the following elements:

a balancer having a hollow annular section and being spun with a disc unitarily;

a magnetic substance housed in the hollow annular section;

a magnetic generator for generating magnetic flux which couples with the magnetic substance through electric-magnetic transducing; and a controller for controlling an output from the magnetic generator.

This structure allows the controller to control, responsive to the need, the intensity of magnetic field which attracts and retains the magnetic substance, thereby controlling the balance of the disc more finely. As a result, shocks to the wall of the hollow annular section by the magnetic substance can be decreased, and in particular, read-errors at the change of disc rpm can be substantially reduced.

The controller can continue switching on/off the magnetic generator intermittently so that when the rpm is changed from low to high, and after the change and when the rpm becomes stable, the magnetic field for attracting and retaining the magnetic substance can be switched off. As a result, read-errors are reduced as well as the power consumption of the magnetic generator is lowered.

DETAILED DESCRIPTION OF PREFERRED EMBODIMENTS

Exemplary embodiments of the present invention are demonstrated hereinafter with reference to the accompanying drawings.

First Exemplary Embodiment

Figure 1:
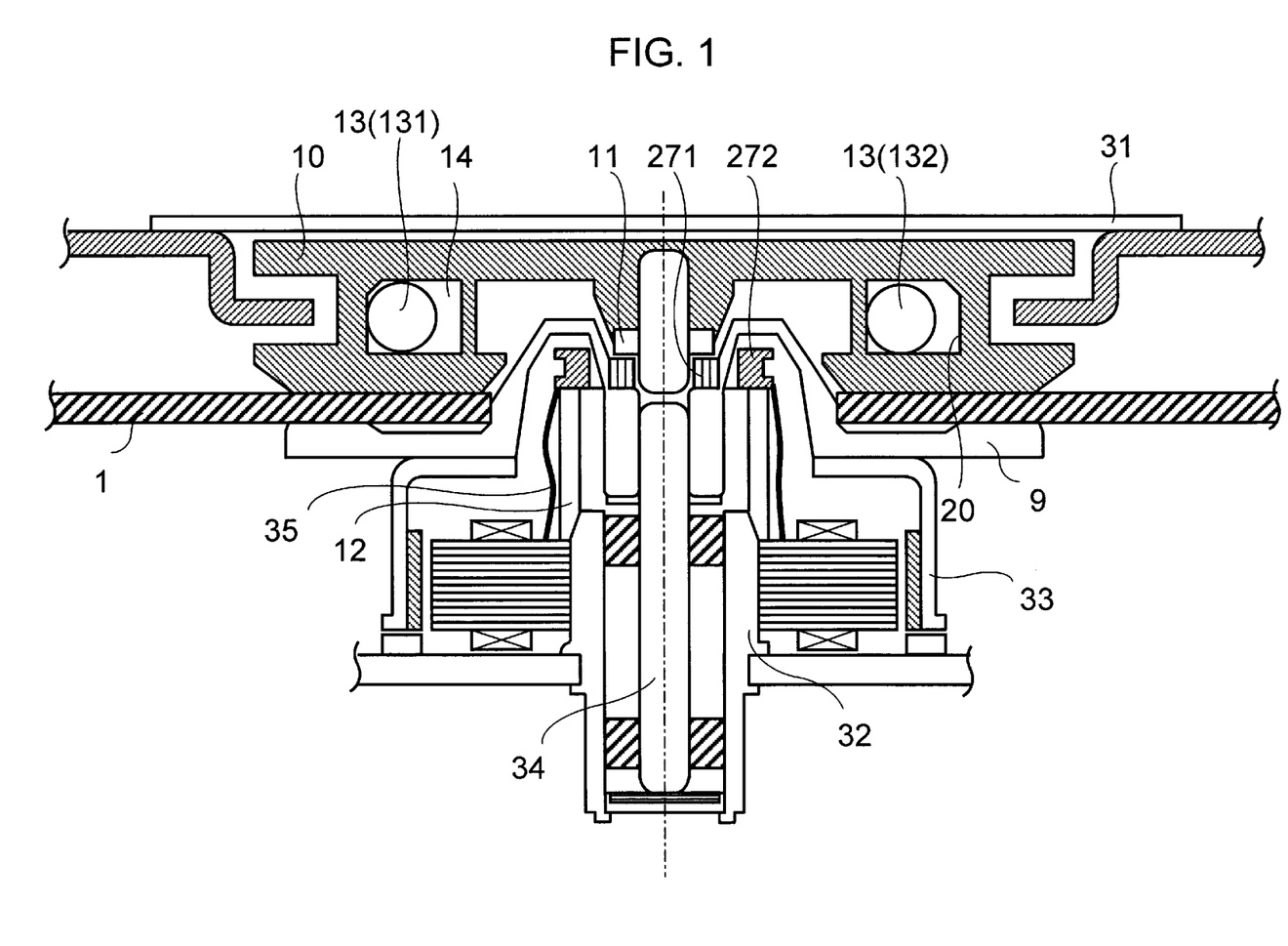
FIG. 1 is a lateral cross section of an essential part of an optical disc drive apparatus in accordance with a first exemplary embodiment of the present invention.

FIG. 1 is a lateral cross section of an essential part of an optical disc drive apparatus in accordance with the first exemplary embodiment of the present invention, and shows a case where an electromagnet is disposed at a fixed place of a spindle motor.

The elements, shown in FIG. 1, having the same functions as described in the conventional case bear the same reference marks.

The disc drive apparatus used in the first embodiment differs from the conventional one shown in FIG. 6 in the following points: Magnet 271 is smaller than the conventional one, and is disposed to a turntable. Clamp 10 has yoke 11, and yoke 11 faces magnet 271 via space. Disc 1 is held between clamp 10 and turntable 9 by the attraction between magnet 271 and yoke 11. Electromagnet 272, i.e. a magnetic generator by electric-magnetic transducing, works to cancel the unbalance of disc 1. When the rpm of disc 1 changes, the self-vibration of disc 1 is reduced, whereby crash sound between balls 13 and the wall of hollow annular section 14 as well as read-errors can be arrested.

The structure in accordance with the first embodiment is detailed with reference to FIG. 1.

In FIG. 1, a spindle motor is so called "outer rotor type", i.e. rotor 33 is disposed outside stator 32. Rotor 33 and motor shaft 34 spin disc 1 together with turntable 9 and clamp 10. Electromagnet 272 is shaped in a hollow cylinder, and fixed to supporter 12 linked to stator 32. Electromagnet 272 is powered from the power source of the motor via lead-wire 35.

Canceling the unbalance of disc 1 at spinning in this first embodiment is demonstrated hereinafter.

When disc 1 having unbalance spins at a high rpm, centrifugal force 19 from vibration center 23 shown in FIG. 7 acts on balls 13, so that balls 13 are urged against outer wall 20 of hollow-annular-section 14 of clamp 10 (status shown by ball position 131). Then balls 13 roll in the direction opposite to unbalance direction of disc 1, and stop at a place where the unbalance force is canceled. Balls 13 are spun unitarily with clamp 10, whereby the unbalance of disc is canceled. When disc 1 changes its speed from the high rpm to a low rpm such as for audio play, centrifugal force 19 acting on balls 13 decreases. Thus balls 13 are released from outer wall 20 and adhered to the inner wall of hollow annular section 14 (status shown by ball position 132).

Figure 3:
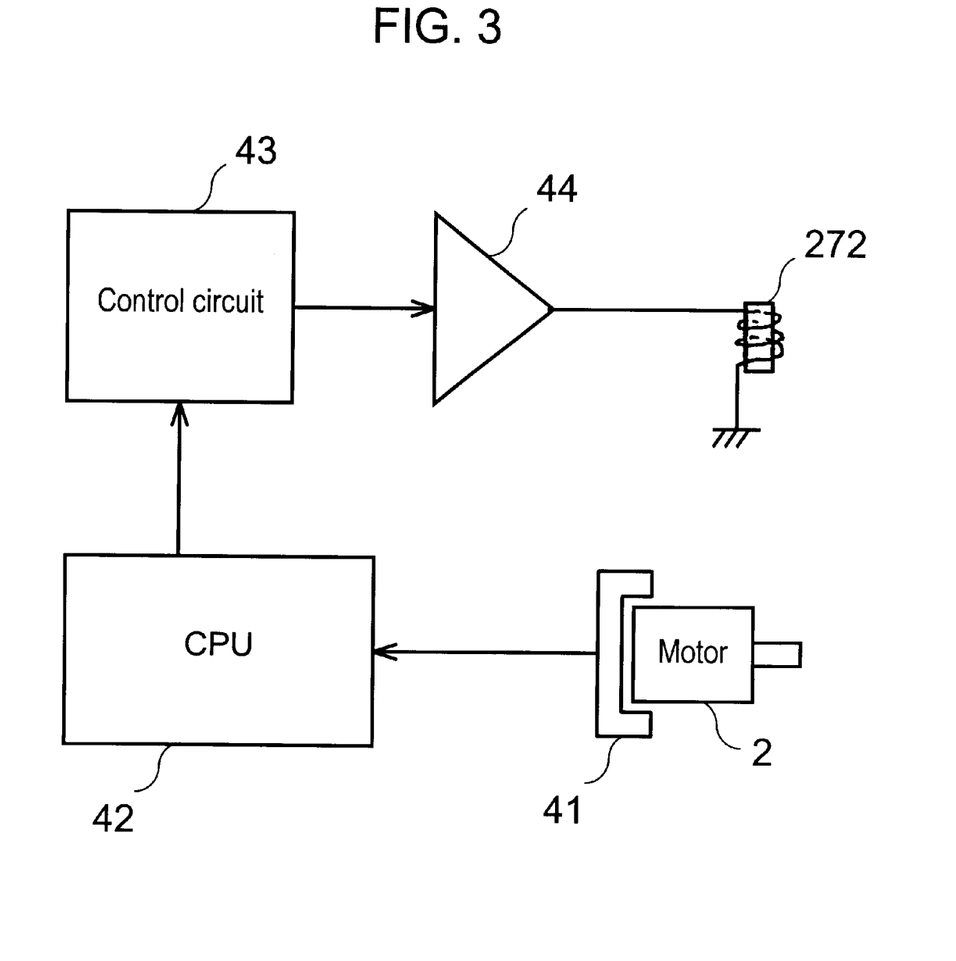
FIG. 3 is a block diagram illustrating a structure including a controller for controlling an electromagnet used in the apparatuses in accordance with the first and second embodiments.

FIG. 3 is a block diagram illustrating a structure including a controller for controlling an electromagnet used in an optical disc drive apparatus in accordance with the first embodiment.

In FIG. 3, the controller comprises e.g. CPU 42, control circuit 43 and current amplifying circuit 44. FG pulse generator 41 counts a number of rotations of spindle motor 2. CPU 42 determines the status of the number of rotations of motor 2 based on an output from pulse generator 41. Control circuit 43 receives a control signal from CPU 42 and outputs a pulse voltage where on-off duty has been varied (pulse width modulation) to current amplifying circuit 44. Circuit 44 receives the pulse voltage from control circuit 43, and supplies current responsive to the on-off duty to electromagnet 272. As such, the power responsive to the number of rotations of motor 2 is supplied to electromagnet 272.

This structure allows electromagnet 272 to save power consumption through the following procedure: When CPU 42 detects that the number of rotations becomes stable after disc 1 changes its rpm from high to low, control circuit 43 instructs to stop supplying the power to electromagnet 272. Also at a high rpm in using a disc with less unbalance force, there may be a case where powering electromagnet 272 is desirably stopped. In this case, an acceleration sensor (not shown) is attached to sub-base 6 or stator 32, and supplying the power to electromagnet 272 can be stopped when the vibration is less than a given level based on the detected result.

The structure used in this first embodiment allows electromagnet 272 to be disposed on the motor side under turntable 9, so that the power source to the motor also powers electromagnet 272. As a result, an electric wiring to magnet 272 can be shortened.

Further, a balancer having some weight is coupled to an end of motor shaft 34, so that eccentricity of shaft 34 can be reduced.

Second Exemplary Embodiment

Figure 2:
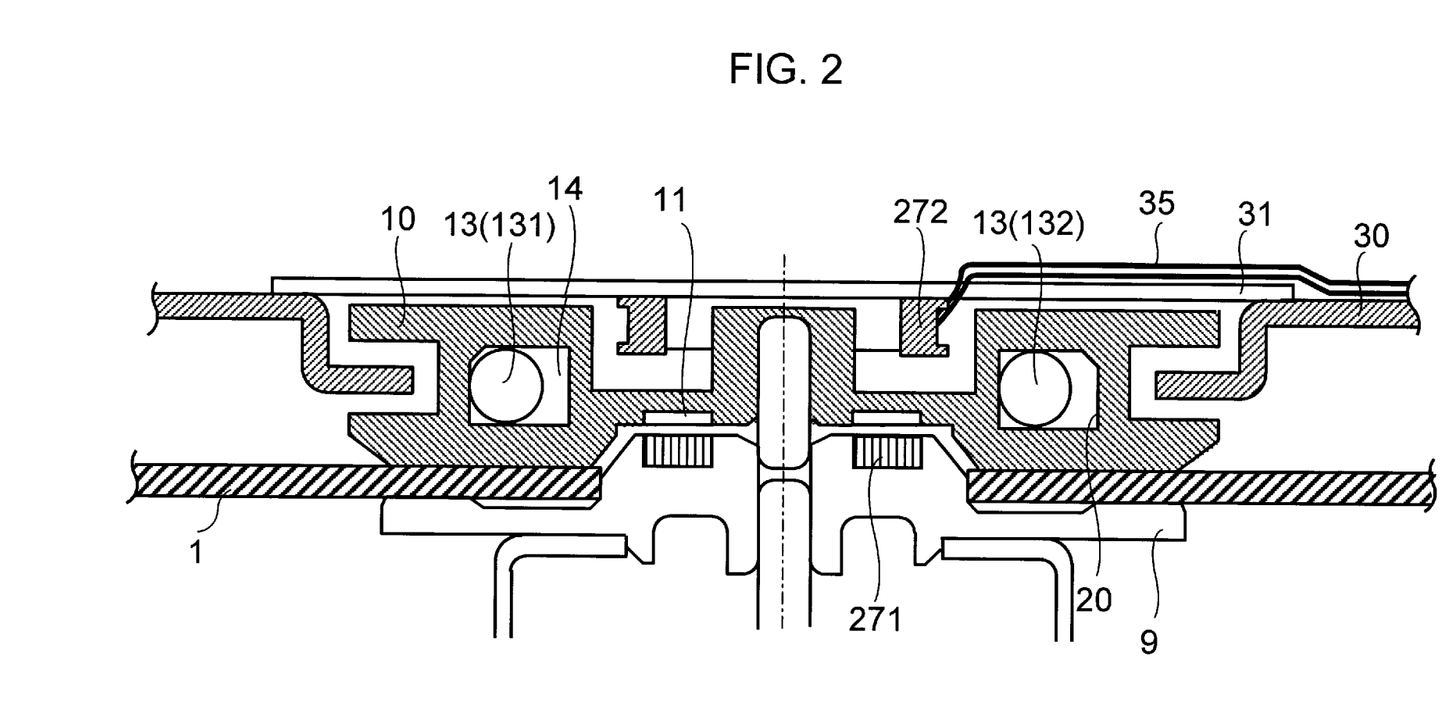
FIG. 2 is a lateral cross section of an essential part of an optical disc drive apparatus in accordance with a second exemplary embodiment of the present invention.

FIG. 2 is a lateral cross section of an essential part of an optical disc drive apparatus in accordance with the second exemplary embodiment of the present invention, and shows that an electromagnet is disposed on a protective plate of a clamp.

Figure 4A:
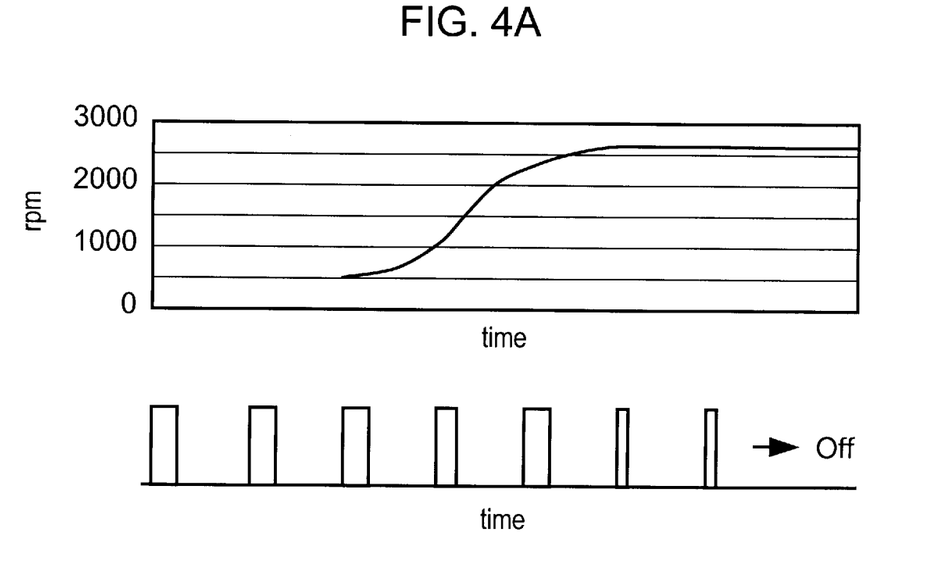
FIG. 4A and FIG. 4B illustrate time-dependent changes of a number of revolving of a disc, and the corresponding time-dependent changes of voltage waveform of pulses applied to the electromagnet.
Figure 4B:
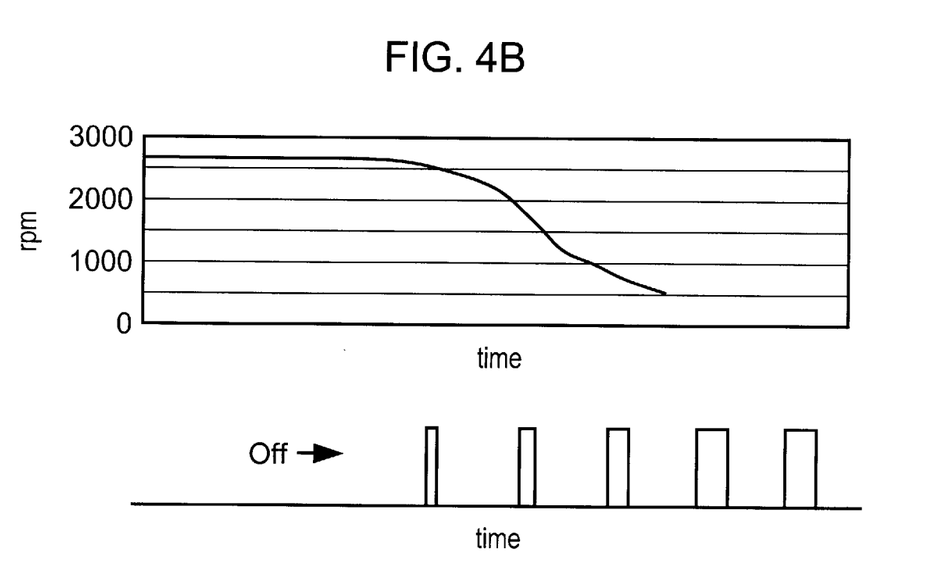

FIG. 4A illustrates time-dependent changes of a number of rotations of a disc from a low rpm to a high rpm, and the corresponding time-dependent changes of voltage waveform of the pulses applied to the electromagnet. FIG. 4B illustrates time-dependent changes of a number of rotations of a disc from a high rpm to a low rpm, and the corresponding time-dependent changes of voltage waveform of the pulses applied to the electromagnet.

In FIG. 2, clamp protective plate 31 is disposed over clamp 10. Cylindrical electromagnet 272 is fixed to a lower face of damp protective plate 31 with screws (not shown). In this case, lead-wire 35 for powering electromagnet 272 is wired from the power source of the spindle motor or the apparatus to the magnet by running the lead-wire on or inside of top plate 30 of the housing and clamp protective plate 31. However, the driving section of the conventional spindle motor as well as the turntable is not needed to be modified, therefore, general-use components can be advantageously used.

The second embodiment differs from the first embodiment in the following points: When a number of rotations of the disc changes, the on-off duty of pulses applied to electromagnet 272 is changed in proportion to the number of rotations, whereby centrifugal force 19 applied to balls 13 can be controlled. This prevents or eases balls 13 from crashing to the inner or outer wall of hollow annular section 14, so that read-errors due to shocks can be prevented more effectively.

In FIG. 3, CPU 42 receives an output from FG pulse generator 41 and determines the present status, i.e. (1) whether the disc is driven at the low rpm, (2) changed from the low to the high rpm, or (3) changed from the high to the low rpm. Based on the determination, control circuit 43 controls an on-off duty of a pulse applied to electromagnet 271.

In other words, as shown in FIG. 4A, when CPU 42 receives the output from pulse generator 41 and determines that the status is in the change from the low to the high rpm, control circuit 43 gradually widens the on-period of the pulse applied to electromagnet 271 in proportion to the increase of rpm of motor 2. Balls 13 thus moves to the outer wall of the hollow annular section 14 smoothly without generating sound by crash against the wall of section 14.

On the contrary, as shown in FIG. 4B, as for the change from the high to the low rpm, control circuit 43 gradually narrows the on-period of the pulse applied to electromagnet 271 in proportion to the rpm of motor 2. Balls 13 thus move smoothly and are stably adhered to the inner wall of the hollow annular section 14 without generating the sound by crash against the wall of section 14.

As such, in this second embodiment, the shock generated by moving the magnetic substances between the inner and outer walls of hollow annular section 14 can be damped responsive to the change of the rpm of the disc.

The substances used for balls 13 are iron, nickel, cobalt, or alloys including these respective elements, or other ferromagnetic-substances comprising oxide substances. Any materials having magnetic adhesion characteristics are usable. The shape of the magnetic substance is not always a ball, but any shapes as far as it has a curve can be usable. These substances of any shapes having a curve can arrest shocks and sound including the rolling noises, crash noises between the ball and the clamp, slide noises, and the like, so that errors including a read-error and out of control can be substantially reduced.

The disc drive apparatus of the present invention allows a disc having unbalance in itself to record/reproduce data in a stable manner from a high rpm to a low rpm. In the low rpm mode such as for an audio play, the disc driving apparatus can arrest noises. Further, the disc drive apparatus can eliminate shocks due to crashes of balls against the inner or outer wall of a hollow annular section when the rpm suddenly changes, so that errors including a read-error and a spin-up time over can be prevented.

INDUSTRIAL APPLICABILITY

The present invention can be utilized in a disc drive apparatus such as a CD-ROM drive apparatus, CD-R drive apparatus where data is recorded/reproduced to/from a medium, i.e. a disc.

The disc drive apparatus of the present invention includes a balancer having a hollow annular section and unitarily spinning with the disc, magnetic substances housed in the hollow annular section, a magnetic generator for generating magnetic flux coupling with the magnetic substances through electric-magnetic transducing, and a controller for controlling an output from the magnetic generator. This vibration damper built in the disc drive apparatus allows the apparatus to cancel the unbalance at spinning the disc as well as arrest read-errors at a change of rpm or a spin-up.

What is claimed is:

1. A disc drive apparatus comprising:

a balancer having a hollow annular section and unitarily spinning with a disc;

at least one magnetic material housed in said hollow annular section:

a magnetic generator for generating magnetic flux coupling with said at least one magnetic material through electric-magnetic transducing, the magnetic generator substantially stationary when the balancer and the disc are spinning; and a controller for controlling an output from said magnetic generator;

wherein said controller controls said magnetic generator to continue generating magnetic flux intermittently.

2. The disc drive apparatus as defined in claim 1, wherein said controller changes power supplied to said magnetic generator responsive to revolutions per minute (rpm) of the disc for controlling attraction of said at least one magnetic material by said magnetic generator.

3. The disc drive apparatus as defined in claim 1 or claim 2, wherein said balancer comprises a clamp having a hollow annular section and unitarily rotating with the disc, as well as the at least one magnetic material having a curve thereon.

4. The disc drive apparatus as defined in claim 1 or claim 2 further comprising a turntable and a motor for rotating said turntable, the disc and said balancer unitarily with each other, wherein said magnetic generator is disposed in said motor.

* * * * *